(12) United States Patent
Thorsen

(10) Patent No.: US 11,969,017 B2
(45) Date of Patent: *Apr. 30, 2024

(54) METHOD OF MANUFACTURING AN AEROSOL PROVISION APPARATUS AND AN AEROSOL PROVISION APPARATUS

(71) Applicant: NICOVENTURES TRADING LIMITED, London (GB)

(72) Inventor: Mitchel Thorsen, London (GB)

(73) Assignee: NICOVENTURES TRADING LIMITED, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/153,158

(22) Filed: Jan. 11, 2023

(65) Prior Publication Data
US 2023/0157364 A1 May 25, 2023

Related U.S. Application Data

(63) Continuation of application No. 16/334,579, filed as application No. PCT/EP2017/073363 on Sep. 15, 2017, now Pat. No. 11,602,173.

(Continued)

(51) Int. Cl.
*A24F 40/46* (2020.01)
*A24F 40/51* (2020.01)
(Continued)

(52) U.S. Cl.
CPC .............. *A24F 40/46* (2020.01); *A24F 40/51* (2020.01); *A24F 40/70* (2020.01); *F16L 59/065* (2013.01);
(Continued)

(58) Field of Classification Search
CPC .......... A24F 40/46; A24F 40/70; A24F 40/51; A24F 40/20; F16L 59/065; G05D 23/193;
(Continued)

(56) References Cited

U.S. PATENT DOCUMENTS 6,501,052 B2 * 12/2002 Cox ..................... A61M 15/025
219/486
7,173,222 B2 * 2/2007 Cox ..................... A61M 11/042
219/486
(Continued)

FOREIGN PATENT DOCUMENTS

CN 1633247 A 6/2005
CN 103844359 A 6/2014
(Continued)

OTHER PUBLICATIONS

"International Preliminary Report on Patentability Received for PCT Patent Application No. PCT/EP2017/073363, dated Jan. 11, 2019", 19 pages.
(Continued)

*Primary Examiner* — Peter G Leigh
(74) *Attorney, Agent, or Firm* — Husch Blackwell LLP

(57) ABSTRACT

A method of manufacturing an aerosol provision apparatus for heating smokable material to volatilize at least one component of the smokable material, and an aerosol provision apparatus, are described. The method includes providing a heater arrangement for heating smokable material contained in use within the apparatus, the heater arrangement including at least a first heating zone and a second heating zone for heating different portions of the smokable material, providing a temperature sensor for each of the first and second heating zones, each temperature sensor for providing temperature measurements to be used as input temperature measurements for a temperature control loop, the control loop for controlling the heater arrangement to heat its associated respective heating zone to a target temperature based on the input temperature measurements acquired by the associated temperature sensor, and positioning each temperature sensor in its associated heating zone at a respective position selected so that if the heating arrange- (Continued)

ment were to heat the first and second heating zones so that the temperature sensors measure the same pre-selected target temperature, a temperature gradient across the length of the heating zones between the temperature sensors would be optimized as being substantially flat.

20 Claims, 12 Drawing Sheets

Related U.S. Application Data

(60) Provisional application No. 62/396,999, filed on Sep. 20, 2016.

(51) Int. Cl.
| | |
|---|---|
| *A24F 40/70* | (2020.01) |
| *F16L 59/065* | (2006.01) |
| *G05D 23/19* | (2006.01) |
| *H05B 3/00* | (2006.01) |
| *A24F 40/20* | (2020.01) |

(52) U.S. Cl.
CPC ......... *G05D 23/193* (2013.01); *H05B 3/0014* (2013.01); *A24F 40/20* (2020.01); *H05B 2203/005* (2013.01); *H05B 2203/037* (2013.01)

(58) Field of Classification Search
CPC ............ H05B 3/0014; H05B 2203/005; H05B 2203/037
USPC .......................................................... 131/329
See application file for complete search history.

(56) References Cited

U.S. PATENT DOCUMENTS

| | | | |
|---|---|---|---|
| 9,301,547 | B2 | 4/2016 | Liu |
| 9,357,803 | B2 | 6/2016 | Egoyants et al. |
| 11,602,173 | B2 * | 3/2023 | Thorsen ............... H05B 3/0014 |
| 2002/0079309 | A1* | 6/2002 | Cox ..................... A61M 11/041 |
| | | | 219/486 |
| 2003/0056791 | A1* | 3/2003 | Nichols ............... A61M 15/025 |
| | | | 128/203.16 |
| 2003/0132219 | A1* | 7/2003 | Cox .................... A61M 15/025 |
| | | | 392/397 |
| 2003/0154991 | A1 | 8/2003 | Fournier et al. |
| 2004/0050383 | A1 | 3/2004 | Cox et al. |
| 2011/0155718 | A1 | 6/2011 | Greim et al. |
| 2012/0260927 | A1 | 10/2012 | Liu |
| 2013/0133675 | A1 | 5/2013 | Shinozaki et al. |
| 2013/0306084 | A1 | 11/2013 | Flick |
| 2014/0000638 | A1 | 1/2014 | Sebastian et al. |
| 2014/0060554 | A1 | 3/2014 | Collett et al. |
| 2014/0096781 | A1 | 4/2014 | Sears et al. |
| 2014/0209105 | A1* | 7/2014 | Sears ...................... A24F 40/44 |
| | | | 131/328 |
| 2014/0305449 | A1* | 10/2014 | Plojoux ................. A24F 40/46 |
| | | | 131/328 |
| 2014/0338680 | A1* | 11/2014 | Abramov ................ A24F 40/20 |
| | | | 131/328 |
| 2014/0360515 | A1 | 12/2014 | Vasiliev et al. |
| 2015/0208727 | A1 | 7/2015 | Kuczaj |
| 2016/0088875 | A1 | 3/2016 | Egoyants et al. |
| 2016/0174610 | A1* | 6/2016 | Kuczaj ................. H05B 1/0244 |
| | | | 392/394 |
| 2016/0235122 | A1 | 8/2016 | Krietzman |
| 2016/0255879 | A1* | 9/2016 | Paprocki ................ A24F 40/46 |

FOREIGN PATENT DOCUMENTS

| | | | | |
|---|---|---|---|---|
| CN | 203618781 | U | | 6/2014 |
| CN | 104770895 | A | | 7/2015 |
| CN | 104812260 | A | | 7/2015 |
| CN | 104812260 | A | * 7/2015 | ............ A24F 40/53 |
| CN | 204440200 | U | | 7/2015 |
| CN | 205072071 | U | | 3/2016 |
| CN | 105682488 | A | | 6/2016 |
| EP | 2882308 | A1 | | 6/2015 |
| EP | 2907398 | A1 | | 8/2015 |
| GB | 2534213 | A | | 7/2016 |
| JP | 2013-511962 | A | | 4/2013 |
| JP | 2022103283 | A | | 7/2022 |
| WO | 2009/118085 | A1 | | 10/2009 |
| WO | 2012/014490 | A1 | | 2/2012 |
| WO | 2014/102092 | A1 | | 7/2014 |
| WO | 2015/062983 | A2 | | 5/2015 |
| WO | 2015/140312 | A1 | | 9/2015 |
| WO | 2016/115893 | A1 | | 7/2016 |
| WO | WO-2016115893 | A1 | * 7/2016 | ............ A24F 40/44 |

OTHER PUBLICATIONS

"International Search Report and Written Opinion Received for PCT Patent Application No. PCT/EP2017/073363, dated Dec. 21, 2017", 12 pages.
"Office Action received for Japanese Patent Application No. 2019-515228, dated Jun. 23, 2020", 4 pages.

* cited by examiner

METHOD OF MANUFACTURING AN AEROSOL PROVISION APPARATUS AND AN AEROSOL PROVISION APPARATUS

PRIORITY CLAIM

The present application is a Continuation of U.S. application Ser. No. 16/334,579, filed Mar. 19, 2019, which is a National Phase entry of PCT Application No. PCT/EP2017/073363, filed Sep. 15, 2017, which claims priority from U.S. Provisional Application No. 62/396,999, filed Sep. 20, 2016, which is hereby fully incorporated herein by reference.

TECHNICAL FIELD

The present disclosure relates to a method of manufacturing an aerosol provision apparatus and to an aerosol provision apparatus.

BACKGROUND

Articles such as cigarettes, cigars and the like burn tobacco during use to create tobacco smoke. Attempts have been made to provide alternatives to these articles, which burn tobacco, by creating products that release compounds without burning. Examples of such products are so-called heat-not-burn products, also known as tobacco heating products or tobacco heating devices, which release compounds by heating, but not burning, the material. The material may be for example tobacco or other non-tobacco products or a combination, such as a blended mix, which may or may not contain nicotine.

SUMMARY

According to a first aspect of the present disclosure, there is provided a method of manufacturing an aerosol provision apparatus for heating smokable material to volatilize at least one component of the smokable material, the method comprising: providing a heater arrangement for heating smokable material contained in use within the apparatus, the heater arrangement comprising at least a first heating zone and a second heating zone for heating different portions of the smokable material; providing a temperature sensor for each of the first and second heating zones, each temperature sensor for providing temperature measurements to be used as input temperature measurements for a temperature control loop, the control loop for controlling the heater arrangement to heat its associated respective heating zone to a target temperature based on the input temperature measurements acquired by the associated temperature sensor; and positioning each temperature sensor in its associated heating zone at a respective position selected so that if the heating arrangement were to heat the first and second heating zones so that the temperature sensors measure the same pre-selected target temperature, a temperature gradient across the length of the heating zones between the temperature sensors would be optimized as being substantially flat.

According to a second aspect of the present disclosure, there is provided an aerosol provision apparatus for heating smokable material to volatilize at least one component of the smokable material, the apparatus comprising: a heater arrangement for heating smokable material contained in use within the apparatus, the heater arrangement comprising at least a first heating zone and a second heating zone for heating different portions of the smokable material; and a temperature sensor for each of the first and second heating zones, each temperature sensor for providing temperature measurements to be used as input temperature measurements for a temperature control loop, the control loop for controlling the heater arrangement to heat its associated respective heating zone to a target temperature based on the input temperature measurements acquired by the associated temperature sensor; wherein each temperature sensor is positioned in its associated heating zone at a selected position so that, if the heating arrangement were to heat the first and second heating zones so that the temperature sensors measure the same pre-selected target temperature, a temperature gradient across the length of the heating zones between the temperature sensors would be optimized as being substantially flat.

According to a third aspect of the present disclosure, there is provided a method of manufacturing an aerosol provision apparatus for heating smokable material to volatilize at least one component of the smokable material, the method comprising: providing a heater arrangement for heating smokable material contained in use within the apparatus, the heater arrangement comprising at least a first heating zone and a second heating zone for heating different portions of the smokable material; providing a temperature sensor for each of the first and second heating zones, each temperature sensor for providing temperature measurements to be used as input temperature measurements for a temperature control loop, the control loop for controlling the heater arrangement to heat its associated respective heating zone to a target temperature based on the input temperature measurements acquired by the associated temperature sensor; and positioning each temperature sensor in its associated heating zone at a respective position selected so that the temperature sensor for the first heating zone is halfway between a first end of the heater arrangement and a centre of the heater arrangement or is closer to the first end of the heater arrangement than it is to the centre of the heating arrangement, and the temperature sensor for the second heating zone is halfway between a second end of the heater arrangement and a centre of the heater arrangement or is closer to the second end of the heater arrangement than it is to the centre of the heating arrangement.

According to a fourth aspect of the present disclosure, there is provided an aerosol provision apparatus for heating smokable material to volatilize at least one component of the smokable material, the apparatus comprising: a heater arrangement for heating smokable material contained in use within the apparatus, the heater arrangement comprising at least a first heating zone and a second heating zone for heating different portions of the smokable material; a temperature sensor for each of the first and second heating zones, each temperature sensor for providing temperature measurements to be used as input temperature measurements for a temperature control loop, the control loop for controlling the heater arrangement to heat its associated respective heating zone to a target temperature based on the input temperature measurements acquired by the associated temperature sensor, and wherein each temperature sensor is positioned in its associated heating zone at a respective position selected so that the temperature sensor for the first heating zone is halfway between a first end of the heater arrangement and a centre of the heater arrangement or is closer to the first end of the heater arrangement than it is to the centre of the heating arrangement, and the temperature sensor for the second heating zone is halfway between a second end of the heater arrangement and a centre of the heater arrangement or is closer to the second end of the heater arrangement than it is to the centre of the heating arrangement.

BRIEF DESCRIPTION OF THE DRAWINGS

Embodiments of the disclosure will now be described, by way of example only, with reference to the accompanying drawings, in which.

DETAILED DESCRIPTION

Figure 1:
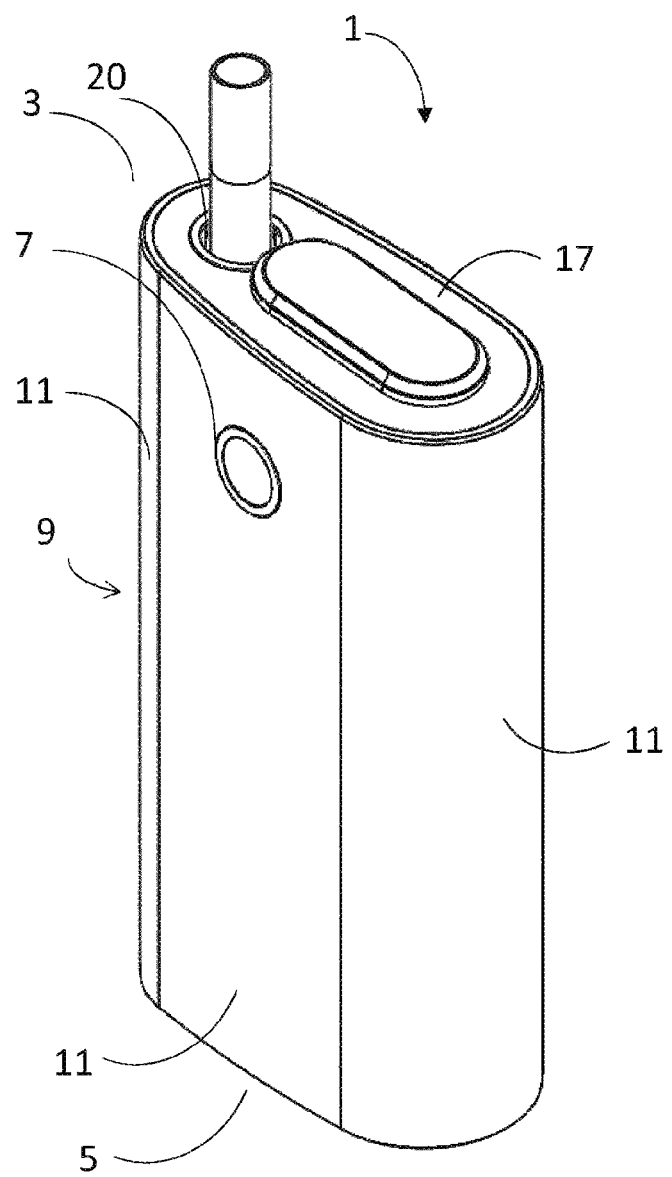
FIG. 1 shows a perspective view of an example of an aerosol provision apparatus for heating a smokable material.

As used herein, the term "smokable material" includes materials that provide volatilized components upon heating, typically in the form of an aerosol. "Smokable material" includes any tobacco-containing material and may, for example, include one or more of tobacco, tobacco derivatives, expanded tobacco, reconstituted tobacco or tobacco substitutes. "Smokable material" also may include other, non-tobacco, products, which, depending on the product, may or may not contain nicotine. "Smokable material" may for example be in the form of a solid, a liquid, a gel or a wax or the like. "Smokable material" may for example also be a combination or a blend of materials.

Apparatus is known that heats smokable material to volatilize at least one component of the smokable material, typically to form an aerosol which can be inhaled, without burning or combusting the smokable material. Such apparatus is sometimes described as a "heat-not-burn" apparatus or a "tobacco heating product" or "tobacco heating device" or similar. Similarly, there are also so-called e-cigarette devices, which typically vaporize a smokable material in the form of a liquid, which may or may not contain nicotine. The smokable material may be in the form of or provided as part of a rod, cartridge or cassette or the like which can be inserted into the apparatus. A heater for heating and volatilizing the smokable material may be provided as a "permanent" part of the apparatus or may be provided as part of the smoking article or consumable which is discarded and replaced after use. A "smoking article" in this context is a device or article or other component that includes or contains in use the smokable material, which in use is heated to volatilize the smokable material, and optionally other components.

Referring initially to FIGS. 1 to 4, there is shown an example of an apparatus 1 arranged to heat smokable material to volatilize at least one component of said smokable material, typically to form an aerosol which can be inhaled. The apparatus 1 is a heating apparatus 1 which releases compounds by heating, but not burning, the smokable material. The apparatus 1 is an aerosol provision device that is an inhalation device (i.e. a user uses it to inhale an aerosol provided by the device). The apparatus 1 is handheld.

A first end 3 is sometimes referred to herein as the mouth or proximal end 3 of the device 1 and a second end 5 is sometimes referred to herein as the distal end 5 of the device 1. The apparatus 1 has an on/off button 7 to allow the apparatus 1 as a whole to be switched on and off as desired by a user.

The apparatus 1 comprises a housing 9 for locating and protecting various internal components of the apparatus 1. In the example shown, the housing 9 comprises a uni-body sleeve 11 that encompasses the perimeter of the apparatus 1, capped with a top panel 17 which defines generally the 'top' of the apparatus 1 and a bottom panel 19 which defines generally the 'bottom' of the apparatus 1. In another example the housing comprises a front panel, a rear panel and a pair of opposite side panels in addition to the top panel 17 and the bottom panel 19.

The top panel 17 and/or the bottom panel 19 may be removably fixed to the uni-body sleeve 11, to permit easy access to the interior of the apparatus 1, or may be "permanently" fixed to the uni-body sleeve 11, for example to deter a user from accessing the interior of the apparatus 1. In an example, the panels 17 and 19 are made of a plastics material, including for example glass-filled nylon formed by injection molding, and the uni-body sleeve 11 is made of aluminum, though other materials and other manufacturing processes may be used.

The top panel 17 of the apparatus 1 has an opening 20 at the mouth end 3 of the apparatus 1 through which, in use, a consumable article 21 containing smokable material may be inserted into the apparatus 1 and removed from the apparatus 1 by a user.

The housing 9 has located or fixed therein a heater arrangement 23, control circuitry 25 and a power source 27. In this example, the heater arrangement 23, the control circuitry 25 and the power source 27 are laterally adjacent (that is, adjacent when viewed from an end), with the control circuitry 25 being located generally between the heater arrangement 23 and the power source 27, though other locations are possible.

The control circuitry 25 may include a controller, such as a microprocessor arrangement, configured and arranged to control the heating of the smokable material in the consumable article 21 as discussed further below.

The power source 27 may be for example a battery, which may be a rechargeable battery or a non-rechargeable battery. Examples of suitable batteries include for example a lithium-ion battery, a nickel battery (such as a nickel-cadmium battery), an alkaline battery and/or the like. The battery 27 is electrically coupled to the heater arrangement 23 to supply electrical power when required and under control of the control circuitry 25 to heat the smokable material in the consumable (as discussed, to volatilize the smokable material without causing the smokable material to burn).

An advantage of locating the power source 27 laterally adjacent to the heater arrangement 23 is that a physically large power source 27 may be used without causing the apparatus 1 as a whole to be unduly lengthy. As will be understood, in general a physically large power source 27 has a higher capacity (that is, the total electrical energy that can be supplied, often measured in Amp-hours or the like) and thus the battery life for the apparatus 1 can be longer.

In one example, the heater arrangement 23 is generally in the form of a hollow cylindrical tube, having a hollow interior heating chamber 29 into which the consumable article 21 comprising the smokable material is inserted for heating in use. Different arrangements for the heater arrangement 23 are possible. For example, the heater arrangement 23 may comprise a single heating element or may be formed of plural heating elements aligned along the longitudinal axis of the heater arrangement 23. The or each heating element may be annular or tubular, or at least part-annular or part-tubular around its circumference. In an example, the or each heating element may be a thin film heater. In another example, the or each heating element may be made of a ceramics material. Examples of suitable ceramics materials include alumina and aluminum nitride and silicon nitride ceramics, which may be laminated and sintered. Other heating arrangements are possible, including for example inductive heating, infrared heater elements, which heat by emitting infrared radiation, or resistive heating elements formed by for example a resistive electrical winding.

In one particular example, the heater arrangement 23 is formed of a polyimide substrate on which is formed one or more heating elements and which is supported by a stainless steel support tube. The heater arrangement 23 is dimensioned so that substantially the whole of the smokable material, when the consumable article 21 is inserted in the apparatus 1, is located within the heating element(s) of the heater arrangement 23 so that substantially the whole of the smokable material is heated in use.

The or each heating element may be arranged so that selected zones of the smokable material can be independently heated, for example in turn (over time) or together (simultaneously) as desired.

The heater arrangement 23 in this example is surrounded along at least part of its length by a thermal insulator 31. The insulator 31 helps to reduce heat passing from the heater arrangement 23 to the exterior of the apparatus 1. This helps to keep down the power requirements for the heater arrangement 23 as it reduces heat losses generally. The insulator 31 also helps to keep the exterior of the apparatus 1 cool during operation of the heater arrangement 23. In one example, the insulator 31 may be a double-walled sleeve which provides a low pressure region between the two walls of the sleeve. That is, the insulator 31 may be for example a "vacuum" tube, i.e. a tube that has been at least partially evacuated so as to minimize heat transfer by conduction and/or convection. Other arrangements for the insulator 31 are possible, including using heat insulating materials, including for example a suitable foam-type material, in addition to or instead of a double-walled sleeve.

The housing 9 may further comprises various internal support structures 37 (best seen in FIG. 4) for supporting all internal components, as well as the heating arrangement 23.

The apparatus 1 further comprises a collar 33 which extends around and projects from the opening 20 into the interior of the housing 9 and a generally tubular chamber 35 which is located between the collar 33 and one end of the vacuum sleeve 31.

Figure 2:
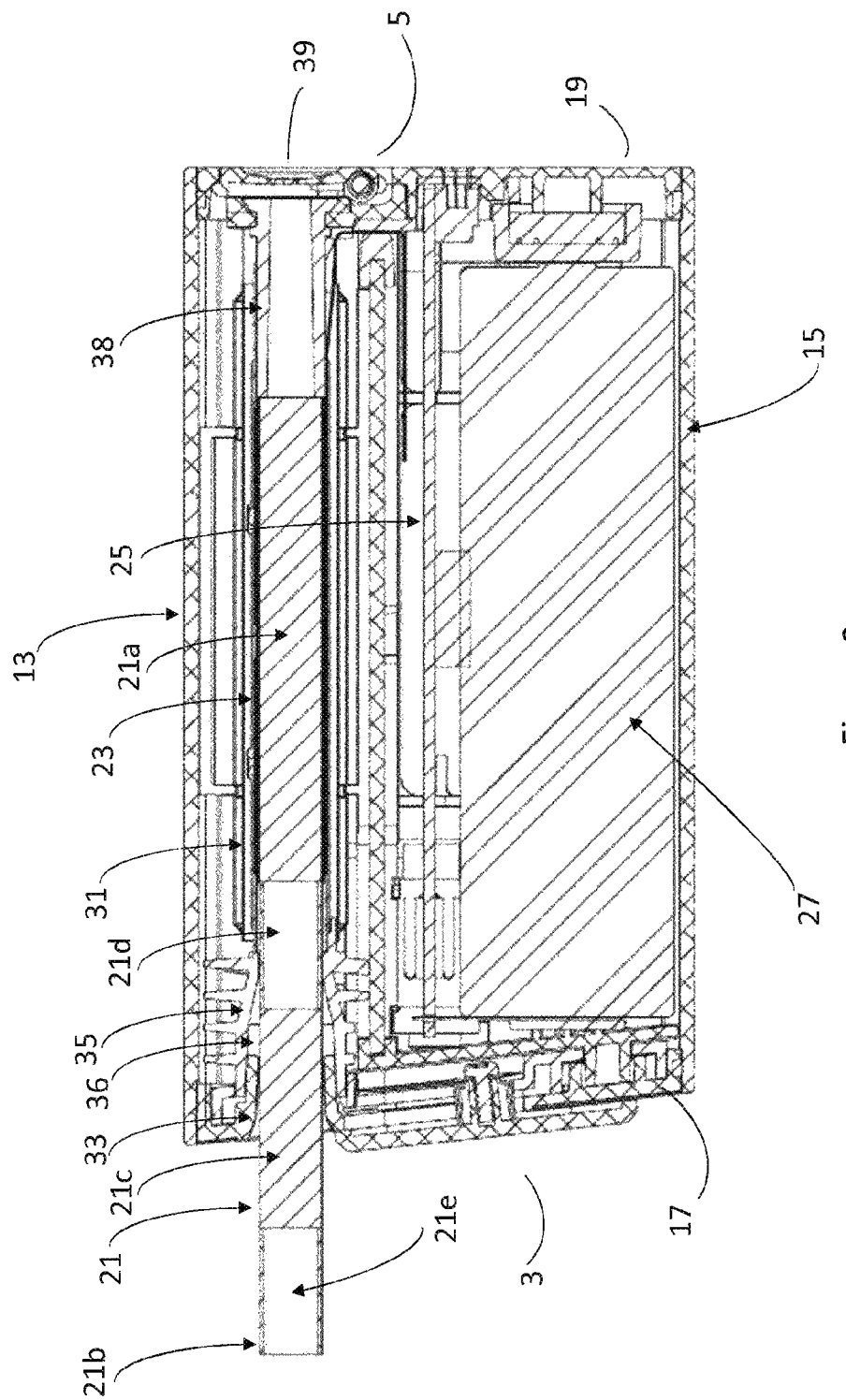
FIG. 2 shows a lateral cross-sectional view of the apparatus of FIG. 1 with a consumable article inserted.
Figure 3:
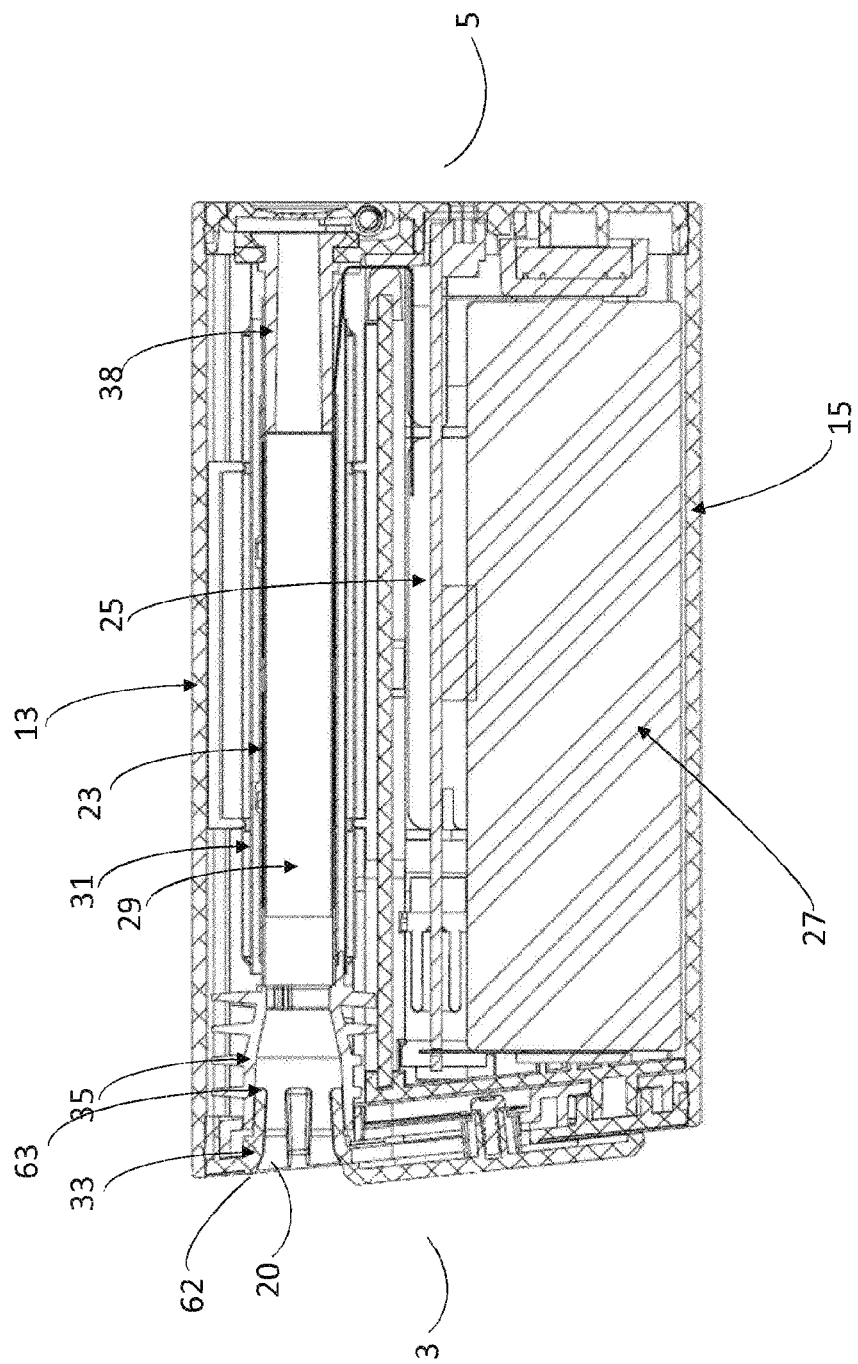
FIG. 3 shows a lateral cross-sectional view of the apparatus of FIG. 1 without a consumable article inserted.
Figure 4:
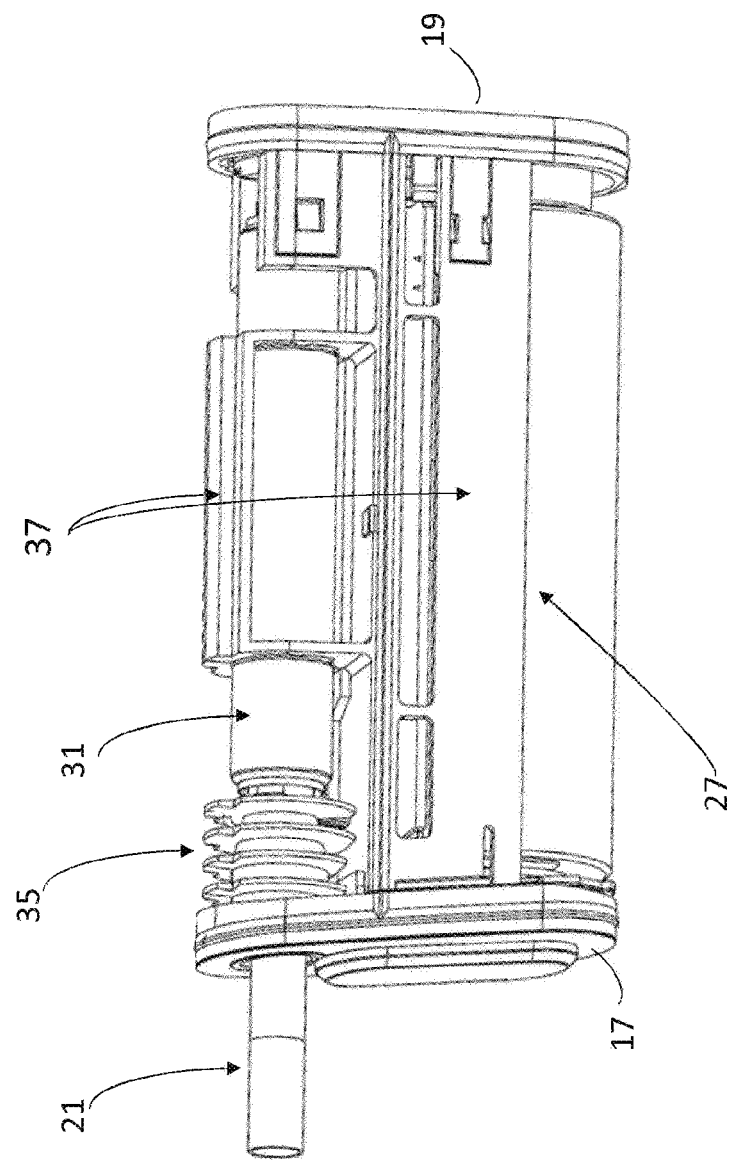
FIG. 4 shows a perspective side view of the apparatus of FIG. 1 with some external panels absent to show interior components of the apparatus.

One end of the chamber 35 connects to and is supported by the collar 33 and the other end of the chamber 35 connects to the one end of the vacuum sleeve 31 and hence supports the vacuum sleeve 31. Accordingly, as best seen in FIG. 3, the collar 33, the chamber 35 and the vacuum tube 31/heater arrangement 23 are arranged co-axially, so that, as best seen in FIG. 2, when the consumable 21 is inserted in the apparatus 1, it extends through the collar 33 and the chamber 35 into the heater chamber 29.

As mentioned above, in this example, the heater arrangement 23 is generally in the form of a hollow cylindrical tube and this tube is in fluid communication with the opening 20 at the mouth end 3 of the device 1 via the chamber 35 and the collar 33.

Referring now to FIGS. 5a to 5d, in this example, the chamber 35 comprises a tubular body 35a that has a first open end 35b and a second open end 35c. The tubular body 35a comprises a first section 35d that extends from the first open end 35b to approximately half away along the tubular body 35a and a second section 35e that extends from approximately half away along the tubular body 35a to the second open end 35c. The first section 35d has a substantially constant internal diameter and the second section 35e has an internal diameter that tapers towards the second open end 35c.

The chamber 35 further comprises a cooling structure 35f, which in this example, comprises a plurality of cooling fins 35f spaced apart along the body 35a, each of which is arranged circumferentially around the body 35a.

The chamber 35 also comprises a flange portion 35g around the second open end 35c and a plurality of projections or clips 35h also arranged around the second open end 35c. Each clip 35h is generally I' shaped and comprises a first portion 35h1 that is joined to the flange portion 35g and a second portion 35h2 that is generally perpendicular to first portion 35h1 and which extends in a direction generally parallel to the longitudinal axis of the tubular body 35a. Each second portion 35h2 comprises a stepped surface 35i that faces towards an axis that extends along the longitudinal axis of the tubular body 35a and which stepped surface 35i is slightly curved.

As best seen in FIG. 3, in this example, the chamber 35 is located in the housing 9 between the collar 33 and the vacuum tube 31/heater 23. More specifically, (i) at the second end 35c, the flange 35g butts an end portion of a polyimide tube of the heater arrangement 23 with the clips 35h resiliently engaging with the polyimide tube via their stepped surfaces 35i and the outer surfaces of the clips mating with an inside of the vacuum sleeve 31 (ii) at the first open end 35b, the chamber 35 connects to the collar 33 by means of ridges 60, which form part of the collar 33 and project into the chamber 35. The ridges 60 are angled from a first end 62 of the collar 33 to a second end 63 of the collar towards an axis that extends along the longitudinal axis of the collar 33 and chamber 35. The ridges lie flush with the internal surface of the chamber 35 to form a snug fit.

As is best appreciated from FIG. 2, the inner diameter of the first section 35d of the hollow chamber 35 is larger than the external diameter of the consumable article 2. There is therefore an air gap 36 between the hollow chamber 35 and the consumable article 21 when it is inserted in the apparatus over at least part of the length of the hollow chamber 35. The air gap 36 is around all of the circumference of the consumable article 21 in that region.

Figure 5B:
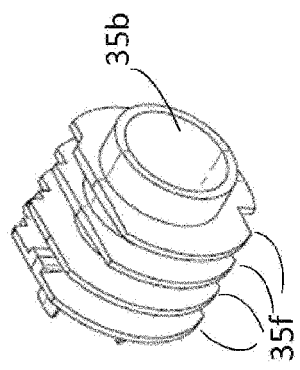
FIG. 5b shows a first perspective view of the internal component of the apparatus of FIG. 1.
Figure 5D:
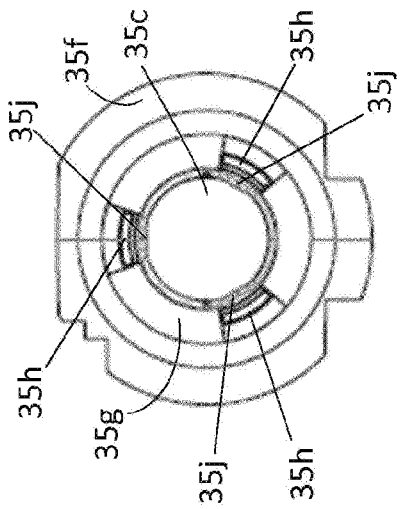
FIG. 5d shows an end view of the internal component of the apparatus of FIG. 1.
Figure 5A:
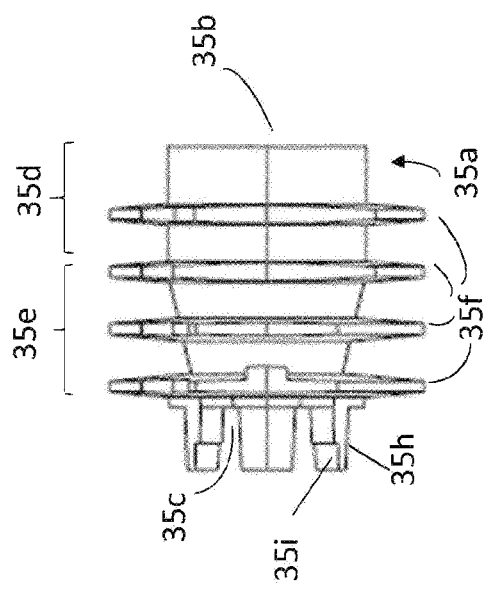
FIG. 5a shows a side view of an internal component of the apparatus of FIG. 1.
Figure 5C:
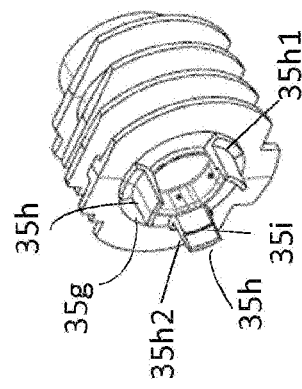
FIG. 5c shows a second perspective view of the internal component of the apparatus of FIG. 1.

As best seen in FIG. 5c and FIG. 5d, at the second open end 35c, the chamber 35 comprises a plurality (in this example 3) of small lobes or ridges 35j arranged circumferentially around an inner surface of the chamber 35 at the periphery of second open end 35c. Each of the lobes 35j extends a small distance in a direction parallel to the longitudinal axis of the chamber 35 and also extends a small amount radially at the second open end 35c. Together, the lobes 35j provide a gripping section that grips the consumable article 21 in order to correctly position and retain the portion of the consumable article 21 that is within the chamber 35 when the consumable article 21 is within the apparatus 1. Between them, the lobes 35j gently compress or pinch the consumable article 21 in the region or regions of the consumable article that are contacted by the lobes 35j. The lobes 35j may be comprised of a resilient material (or be resilient is some other way) so that they deform slightly (for example compress) to better grip the consumable article 21 when it is inserted in the apparatus 1 but then regain their original shape when the consumable article 21 is removed from the apparatus 1. The lobes 35j may be formed integrally with the chamber 35 or may be separate components that are attached within the chamber 35. The inner diameter around the lobes, may be, for example, 5.377 mm.

Figure 6:
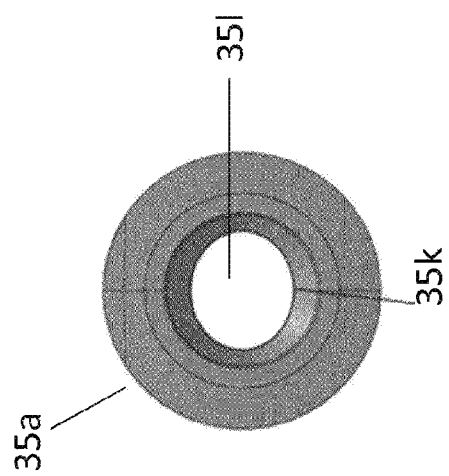
FIG. 6 shows an end view of an alternative internal component of the apparatus of FIG. 1.
Figure 7:
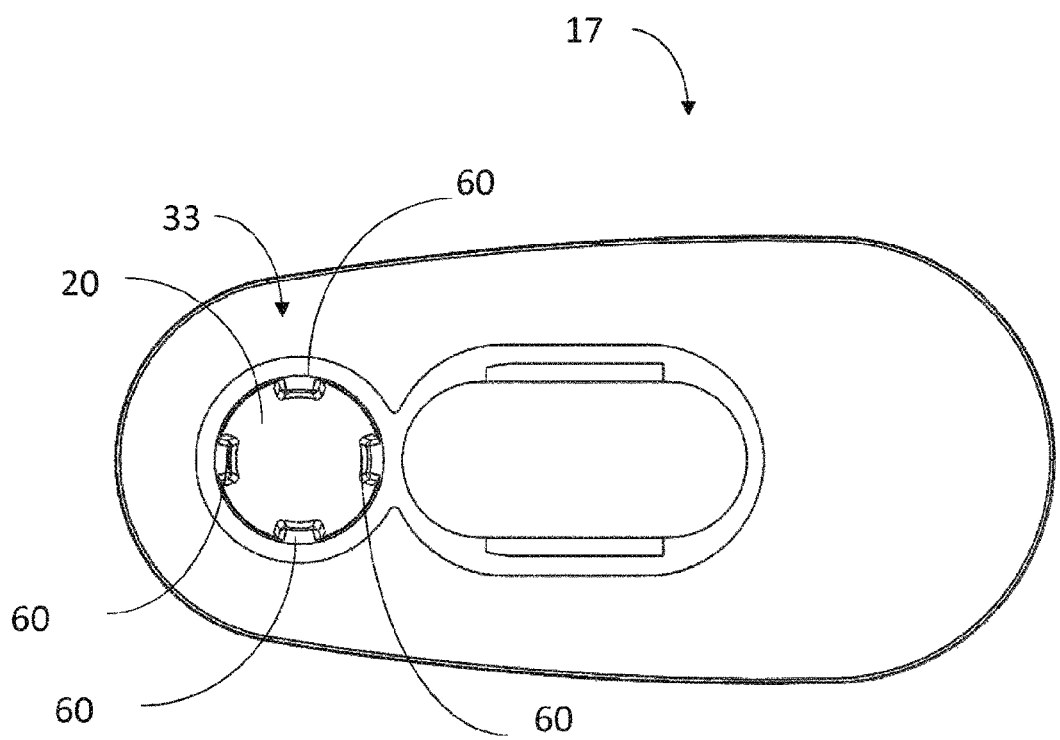
FIG. 7 shows a plan view of a front panel of the aerosol provision apparatus for heating a smokable material.

In an alternative example shown in FIG. 6, a resilient gripping section 35k within the hollow chamber 35 defines a substantially oval aperture 351 which, may extend along the longitudinal axis of the hollow chamber 35, and which when the consumable article 21 is inserted in the apparatus 1, gently compresses or pinches the section of the consumable article 21 that is in the oval aperture 351 so that this section of the consumable article 21 is deformed from being circular to being oval in cross section. In one example, the gripping section 35k is located towards the first open end 35b. In one example, the width of the oval section could be increased or decreased to increase or decrease the insertion/retention force. In a further example, small grooves (not shown) could be added in the surface of the oval aperture 351 that would interfere with the consumable article 21 rather than the entire surface area of the oval aperture 351. This would minimize insertion/removal sensitivity to the transitions of the various consumable article components (tobacco, tipping paper, paper tube) passing through the gripping section 35k.

In a further example a combination of the lobes 35j and the oval gripping section 35k could be used to retain the consumable article 21 in the hollow chamber 35. For example, an oval gripping section 35k and the arrangement of lobes 35j could be spaced apart longitudinally in the hollow chamber 35 and act separately to retain an inserted consumable article 21 in place, or, the lobes 35j could be arranged around the surface of the oval gripping section 35k.

The chamber 35 may be formed of for example a plastics material, including for example polyether ether ketone (PEEK).

Referring again to FIGS. 2 to 4, in an example, the heating chamber 29 has a region 38 of reduced internal diameter towards the distal end 5. This region 38 provides an end stop for the consumable article 21 passed through the opening at the mouth end 3. This region 38 of reduced internal diameter, may for example be provided by a hollow tube of the type described in detail in our U.S. Provisional Patent Application No. 62/185,227, filed on Jun. 26, 2015, the entire content of which is incorporated herein by reference.

The apparatus 1 may further comprise a door 39 at the distal end 5 that opens and closes an opening in the rear panel to provide access to the heating chamber 29 so that the heating chamber can be cleaned. Examples of suitable doors are also discussed in more detail in our U.S. Provisional Patent Application No. 62/185,227.

Referring now to FIGS. 7 to 10 in particular, there is shown an example of the top panel 17 of the apparatus 1. The top panel 17 generally forms the front end 3 of the housing 9 of the apparatus. The top panel 17 supports the collar 33 which defines an insertion point in the form of the opening 20 through which the consumable article 21 is removably inserted into the apparatus 1 in use.

The collar 33 extends around and projects from the opening 20 into the interior of the housing 9. In one example, the collar 33 is integral with the top panel 17 of the housing so the collar 33 and the top panel 17 form a single piece. In an alternative example, the collar 33 is a distinct element from the top panel 17, but can be attached to the top panel 17 through an attachment, such as a locking mechanism, adhesive, or screws. Other attachments that are suitable for attaching the collar 33 to the top panel 17 may be used.

In this example, the collar 33 comprises a plurality of ridges 60 arranged circumferentially around the periphery of the opening 20 and which project into the opening 20. The ridges 60 take up space within the opening 20 such that the open span of the opening 20 at the locations of the ridges 60 is less than the open span of the opening 20 at the locations without the ridges 60. The ridges 60 are configured to engage with a consumable article 21 inserted into the apparatus to assist in securing it within the apparatus 1.

In one example, the ridges 60 are circumferentially equally spaced around the periphery of the opening 20. In one example, there are four ridges 60, in other examples there may be more or fewer than four ridges 60.

Figure 9:
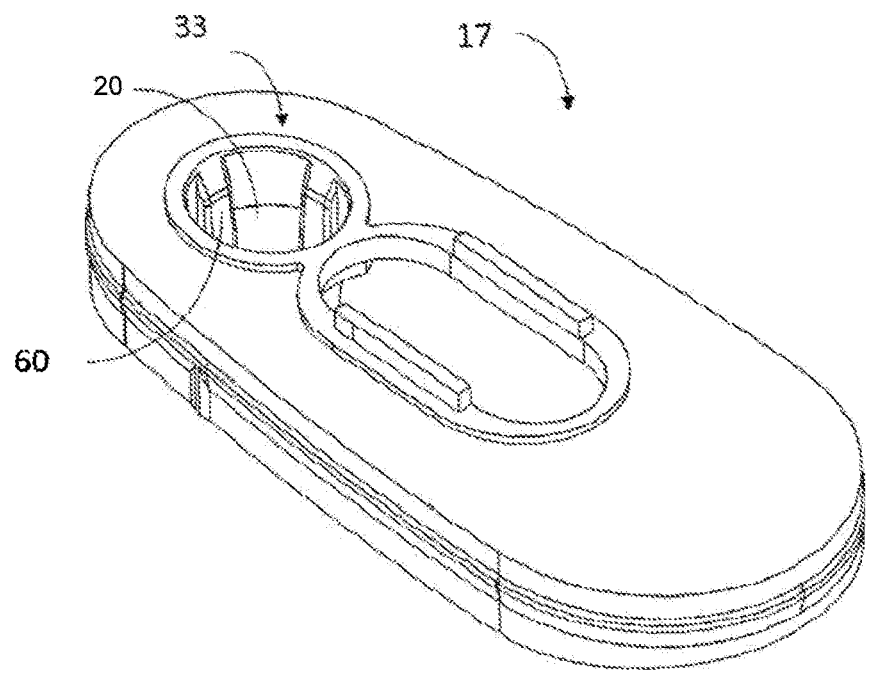
FIG. 9 shows a perspective view of a front panel of the apparatus of FIG. 7.
Figure 10:
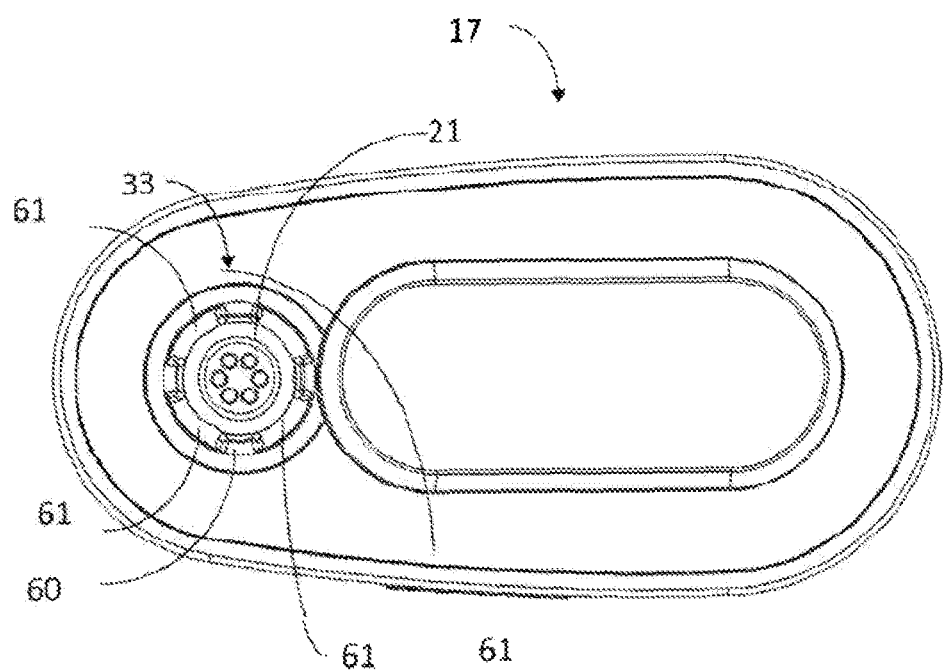
FIG. 10 shows a plan view of a front panel of the apparatus of FIG. 7 with a consumable article inserted.

FIG. 9 shows a plan view of the top panel 17 of the apparatus with a consumable article 21 inserted into the opening 20. The ridges 60 project into the opening 20 to engage with the consumable article 21. The open spaces 61 defined by adjacent pairs of ridges 60 and the consumable article 21 form ventilation paths 61 around the exterior of the consumable article 21. These ventilation paths 61, as will be explained in more detail below, allow hot vapors that have escaped from the consumable article 21 to exit the apparatus 1 and allow cooling air to flow into the apparatus 1 around the consumable 21. The example in FIG. 10 shows four ventilation paths 61 located around the periphery of the consumable article 21, which provide ventilation for the apparatus 1 although there may be more or less such ventilation paths 61.

Figure 8:
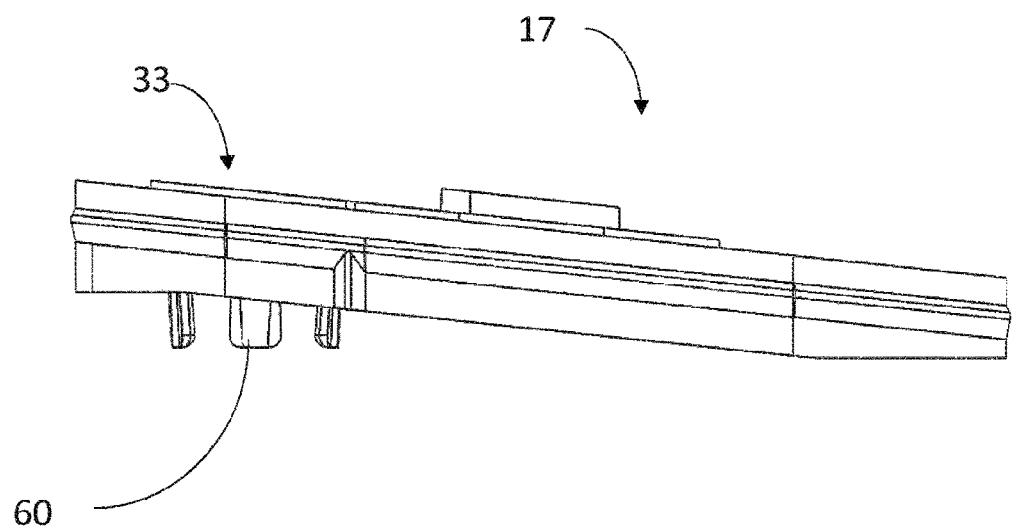
FIG. 8 shows a side view of a front panel of the apparatus of FIG. 7.

As mentioned above, the ridges 60 project radially into the opening 20 but, as best appreciated from FIG. 8, they also extend from the top panel 17 into the housing 9. The projection of the ridges 60 are angled towards each other, such that as the ridges 60 extend into the housing, the distance between the ridges 60 decreases. As best seen in FIG. 3, the projection of the ridges 60 into the housing enables the collar 33 to connect to the chamber 35 by means of the ridges 60 extending through the first open end 35b of the chamber 35 and engaging an inner wall of the chamber 35.

Referring again particularly to FIG. 2, in one example, the consumable article 21 is in the form of a cylindrical rod which has or contains smokable material 21a at a rear end in a section of the consumable article 21 that is within the heating arrangement 23 when the consumable article 21 is inserted in the apparatus 1. A front end of the consumable article 21 extends from the apparatus 1 and acts as a mouthpiece assembly 21b which includes one or more of a filter for filtering aerosol and/or a cooling element 21c for cooling aerosol. The filter/cooling element 21c is spaced from the smokable material 21a by a space 21d and is also spaced from the tip of mouthpiece assembly 21b by a further space 21e. The consumable article 21 is circumferentially wrapped in an outer layer (not shown). In one example, the outer layer of the consumable article 21 is permeable to allow some heated volatilized components from the smokable material to escape the consumable article 21.

In operation, the heater arrangement 23 will heat the consumable article 21 to volatilize at least one component of the smokable material 21a.

The primary flow path for the heated volatilized components from the smokable material 21a is axially through the consumable article 21, through the space 21d, the filter/cooling element 21c and the further space 21e before entering a user's mouth through the open end of the mouthpiece assembly 21b. However, some of the volatilized components may escape from the consumable article 21 through its permeable outer wrapper and into the space 36 surrounding the consumable article 21 in the chamber 35.

It would be undesirable for the volatilized components that flow from the consumable article 21 into the chamber 35 to be inhaled by the user, because these components would not pass through the filter/cooling element 21c and thus be unfiltered and not cooled.

Advantageously, the volume of air surrounding the consumable article 21 in the chamber 35 and the fin-cooled interior wall of the chamber 35 causes at least some of the volatilized components that escape the consumable article 21 through its outer layer to cool and condense on the interior wall of the chamber 35 preventing those volatilized components from being possibly inhaled by a user.

This cooling effect may be assisted by cool air that is able to enter from outside the apparatus 1 into the space 36 surrounding the consumable article 21 in the chamber 35 via the ventilation paths 61, which allows fluid to flow into and out of the apparatus. A ventilation path 61 will be defined between a pair of the plurality of neighboring ridges 60 to provide ventilation around the outside of the consumable article 21 at the insertion point.

In one example, a second ventilation path 61 is provided between a second pair of neighboring ridges for at least one heated volatilized components to flow from the consumable article 21 at a second location. Therefore ventilation is provided around the outside of the consumable article 21 at the insertion point by the first and second ventilation paths 61.

Furthermore, heated volatilized components that escape the consumable article 21 through its outer wrapper do not condense on the internal wall of the chamber 35 and are able to flow safely out of the apparatus 1 via the ventilation paths 61 without being inhaled by a user.

The chamber 35 and the ventilation both aid in reducing the temperature and the content of water vapor composition released in heated volatilized components from the smokable material.

Figure 11:
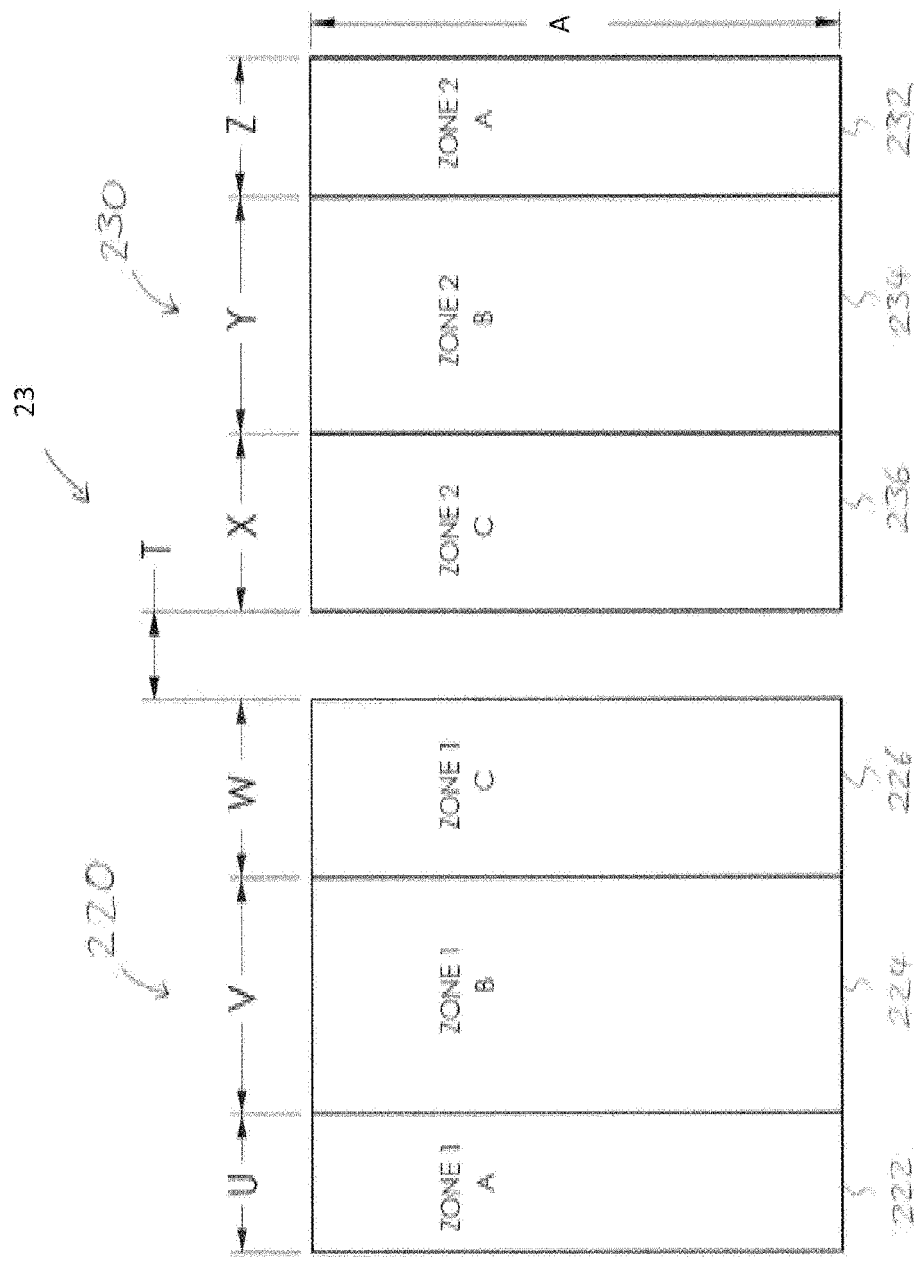
FIG. 11 shows a schematic plan view of a heater arrangement for use in the aerosol provision apparatus for heating a smokable material.

Referring now to FIG. 11, there is shown a first schematic plan view of an example of a heater arrangement 23 for use in an apparatus for heating smokable material. FIG. 11 illustrates schematically different heating zones and sub-heating zones of this example of the heater arrangement 23. The heater arrangement 23 shown in FIG. 11 may be used in, for example, a device 1 of the type described above.

The heater arrangement 23 has a plurality of heating zones for heating different portions of the smokable material to volatilize at least one component of the smokable material inserted into the device 1. In the specific example shown, the heater arrangement 23 has a first heating zone 220 and a second heating zone 230. In other examples the heater arrangement 23 may have only one heater zone or more than two heating zones. At least one of the heating zones may be formed so as to provide plural sub-heating zones within the zone for heating different portions of the smokable material. In other words, at least one of the first and second heating zones 220 and 230 may comprise at least a first sub-heating zone and a second sub-heating zone.

In the example of FIG. 11, the heater arrangement 23 is arranged so that the first and second heating zones 220 and 230 are arranged either side of a center of the heater arrangement (T). Furthermore, in this example, the first heating zone 220 of the heater arrangement 23 has a first sub-heating zone 222, a second sub-heating zone 224 and a third sub-heating zone 226 and the second heating zone 230 has a first sub-heating zone 232, a second sub-heating zone 234 and a third sub-heating zone 236.

The first sub-heating zone 222 of the first heating zone 220 is located towards a first end of the heater arrangement 23, which first end is located towards the mouthpiece end of the device 1. The first sub-heating zone 232 of the second heating zone 230 is located towards a second end of the heater arrangement 23, which second end is located towards the distal end of the device 1. On the other hand, the second sub-heating zones 224 and 234 of the first and second heating zones 220 and 230 respectively are located towards the centre of the heater arrangement with respect to the first sub-heating zones 222 and 232. In this example, the third sub-heating zones 226 and 236 of the first and second heating zones 220 and 230 respectively are located closest to the centre of the heater arrangement 23.

In this example, the first sub-heating zone 222, the second sub-heating zone 224 and the third sub-heating zone 226 of the first heating zone 220 all provide different heating watt densities, with the first sub-heating zone 222 providing a higher watt density than does the second sub-heating zone 224 which provides a higher watt density than does the third sub-heating zone 226. Similarly, in this example, the first sub-heating zone 232, the second sub-heating zone 234 and the third sub-heating zone 236 of the second heating zone 230 all provide different heating watt densities, with the first sub-heating zone 232 providing a higher watt density than does the second sub-heating zone 234 which provides a higher watt density than does the third sub-heating zone 236. This arrangement provides for a higher heat flux at the ends of the heater arrangement 23 where heat can most easily escape, in order that a more even temperature, in other words a flatter temperature gradient, may be maintained within the zones 220 and 230.

In other examples, there may be some sub-heating zones that have the same watt density and other sub-heating zones that have different watt densities.

In use, the different watt densities of the sub-heating zones of the heater arrangement 23 provide a simple way of ensuring that different heat fluxes act on different portions of the smokable material. The heater arrangement 23 can therefore, in some examples, heat different portions of the smokable material in the device 1 to different temperatures. In a specific example, a mouth end portion of the smokable material is heated with a lower heat flux than other portions of the smokable material. The lower heat flux can result in more water vapor condensing from the aerosol prior to inhalation by the user. This can reduce the temperature of the aerosol and also reduce the likelihood of the phenomenon known as "hot puff".

The different watt densities of the various sub-heating zones 222, 224, 226, 232, 234, 236 of the heater arrangement 23 may be achieved in different ways. For example, the various sub-heating zones 222, 224, 226, 232, 234, 236 may have heating elements having different properties, such as being formed of different materials and/or having different electrical resistances and/or different dimensions (including for example different thicknesses or, more generally, different cross-sectional areas). As another example, the various sub-heating zones 222, 224, 226, 232, 234, 236 may have different heat capacities.

The heating zones 220, 230 of the heater arrangement 23 may have different dimensions (lengths, widths, depths) from one another. In the specific example of FIG. 11, the six sub-heating zones 222, 224, 226, 232, 234, 236 of the heater arrangement 23 are of the same width A. However the lengths of the sub-heating zones 222, 224, 226, 232, 234, 236 are not all the same. In this example, the length U, Z of the first sub-heating zone 222 of the first heating zone 220 and the first sub-heating zone 232 of the second heating zone 230 may be the same or substantially similar. However, in this example, the lengths U, Z of the first sub-heating zone 222 of the first heating zone 220 and the first sub-heating zone 232 of the second heating zone 230 are different from the lengths V, W, X, Y of the other sub-heating zones 224, 226, 234, 236.

In some specific examples, the length U may have a range of 5 mm to 6 mm, the length V may have a range of 9 mm to 10 mm, the length W may have a range of 6 mm to 7 mm, the length X may have a range of 6 mm to 7 mm, the length Y may have a range of 9 mm to 10 mm, and the length Z may have a range of 5 mm to 6 mm. The total length of the first heating zone 220 is equal to the sum of the lengths U, V and W, and the total length of the second heating zone 230 is equal to the sum of the lengths X, Y and Z.

Figure 12:
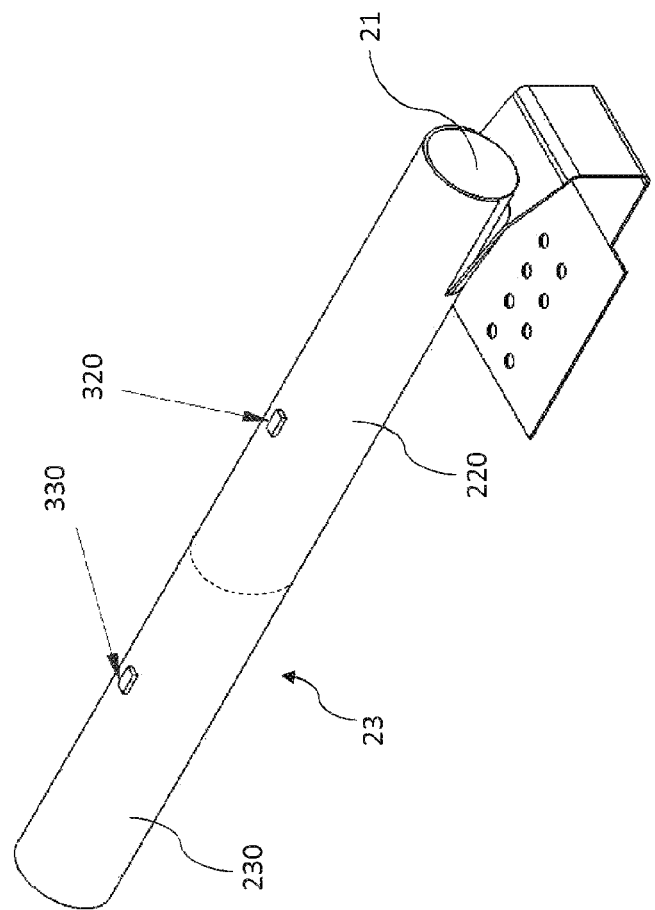
FIG. 12 shows a perspective view of an example arrangement of the heater arrangement of FIG. 11 with a consumable article inserted.

As described above, heater arrangement 23 is generally in the form of a hollow cylindrical tube, having a hollow interior heating chamber 29 into which the consumable article 21 comprising the smokable material is inserted for heating in use. FIG. 12 illustrates the heater arrangement 23 in the form of a hollow cylindrical tube comprising heating zones 220 and 230, and sub-heating zones 222, 224, 226, 232, 234 and 236 (not shown in FIG. 12).

In the example of FIG. 12, there is provided a first temperature sensor 320, and a second temperature sensor 330 for each of the first 220 and second 330 heating zones respectively. In some example, the temperature sensors 320 and 330 may be resistance temperature detectors (RTD). However, in other examples, the temperature sensors 320 and 330 may be other types of temperature sensors, for example, the sensors 320 and 330 may be thermocouples.

Each of the temperature sensors 320, 330, in this example, provides temperature measurements to be used as input temperature measurements for a temperature control loop. In this example, there is a control loop associated with each of the heating zones 220 and 230. Therefore, in this example, there is a first control loop associated with the first heating zone 220 and is provided input temperature measurements by the first temperature sensor 320, and a second control loop associated with the second heating zone 230 and is provided input temperature measurements by the second temperature sensor 330. Each control loop is for controlling the heater arrangement 23 to heat its associated respective heating zone 220, 230 to a target temperature based on the input temperature measurements acquired by the associated temperature sensor 320, 330. In other words, the first control loop controls the heater arrangement 23 to heat the first heating zone 220 to a first target temperature based on input temperature measurements provided by the first sensor 320, and the second control loop controls the heater arrangement 230 to heat the second heating zone 230 to a second target temperature based on input temperature measurements provided by the second sensor 330. In this example, the first and second control loops are implemented by the controller included in the control circuitry 25.

The first and second control loops, in some examples, may be proportional integral derivative (PID) control loops. However, in other examples, any control loop suitable for the smokable material heating device 1 may be used. For example, a control loop based on the rate of change of temperature with time when its respective heating zone is generating heat may be used. In some examples, the first and second control loops may control the heater arrangement 23 to heat the first and second heating zones 220 and 230 by turning the respective first and second heating zones 220 and 230 on or off. The heating zones 220 and 230 may therefore be individually controlled.

It will be understood that the temperatures measured by the first and second temperatures sensors 320 and 330 provide an indication of the temperature within the associated first and second heating zones 220 and 230 respectively. When a sensor measures a given temperature, it can be assumed that at least a part of the heating zone with which that sensor is associated is at the temperature measured by that sensor. However, the temperature sensors 320 and 330 do not necessarily indicate the precise temperature at all points of the heating zones 220 and 230. Since the first and second control loops control the heating zones 220 and 230 using input temperature measurements acquired by the sensors 320 and 330 respectively, the first and second control loops effectively control the temperature in the immediate surroundings of the sensors 320 and 330 respectively. Therefore, it will be understood that the precise position of the temperature sensors 320 and 330, which provide input temperature measurements to their respective control loops to control the temperature of the heating zones 220 and 230, affects the temperature gradient along the length of both the heating zones 220 and 230. The precise position of the sensors 320 and 330 relative to their respective heating zones 220 and 230, as well as their position relative to each other determines the overall temperature gradient over all the zones 220 and 230. Factors such as the length of the zones 220 and 230, the widths of the sub-heating zones 222, 224, 226, 232, 234 and 236, and the properties and dimensions of the thermal insulator 31, among other factors, may also contribute to the temperature gradient along the length of the zones 220 and 230.

In this example, each temperature sensor 320, 330 is positioned in its associated respective heating zone at a selected position so that, if the heating arrangement 23 were to heat the first and second heating zones 220 and 230 so that the temperature sensors 320 and 330 measure the same pre-selected target temperature, a temperature gradient across the length of the heating zones between the temperature sensors, and therefore across the length of the chamber 29, would be optimized as being substantially flat. In other words, the temperature sensors 320 and 330 are positioned such that if the first and second control loops were to control the heater arrangement 23 to heat the heating zones 220 and 230 to first and second target temperatures set equal to each other, the temperature between the sensors 320 and 330 would be substantially constant as a function of the length of the heating zones.

It will be understood that when the temperature sensors 320 and 330 measure the same pre-selected target temperature, it can be assumed that the heating zones 220 and 320 are also at that same pre-selected target temperature.

The positions of the temperature sensors 320 and 330 for obtaining a substantially flat temperature gradient are selected having regard to the other factors affecting the temperature gradient along the length of the heating zones 220 and 230 mentioned above.

In one example, each temperature sensor 320, 330 is positioned in its associated respective heating zone at a respective position selected so that the first temperature sensor 320 for the first heating zone 220 is halfway between the first end of the heater arrangement 23 or is closer to the first end of the heater arrangement 23 than it is to the centre of the heater arrangement 23, and the second temperature sensor 330 for the second heating zone 230 is halfway between the second end of the heater arrangement 23 and a centre of the heater arrangement 23 or is closer to the second end of the heater arrangement 23 than it is to the centre of the heating arrangement 23.

Figure 13:
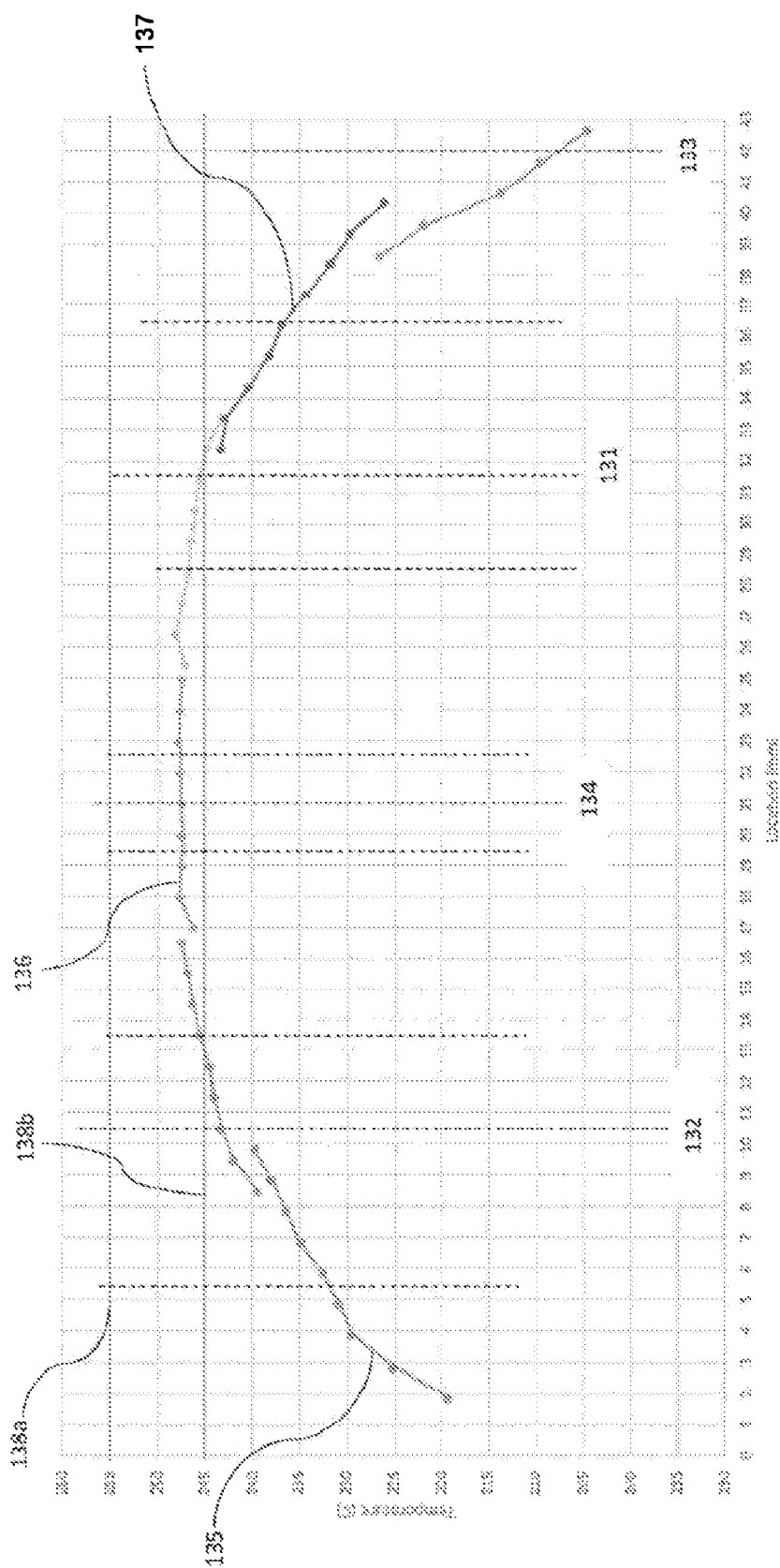
FIG. 13 is a graph showing a first gradient of temperature within the aerosol provision apparatus for heating a smokable material as a function of a spatial dimension of the aerosol provision apparatus.

In the example of FIG. 13, the temperature sensors 320 and 330 are positioned such that the temperature gradient between the sensors 320 and 330 is substantially flat. In this example, the end of the heater arrangement 23 towards the mouthpiece end of the device 1 is indicated by the dashed line 133. The length of the heater arrangement 23 in this example is 42 mm. Dashed lines 131 and 132 indicate the positions of the temperature sensors 320 and 330 respectively. In this example, the sensor 320 is placed 10.4 mm from the mouth piece end of the heater arrangement 23, and the sensor 330 is placed 31.6 mm from the mouthpiece end of the heater arrangement 23. If in this example, the lengths U, V, W, X, Y and Z are within the specific ranges described above in relation to a specific example, the first temperature sensor 320 (associated with/for the first heating zone 220) is positioned in the second sub-heating zone 224 of the first heating zone 220, and the second temperature sensor 234 (associated with/for the second heating zone 230) is positioned in the second sub-heating zone 234 of the second heating zone 230. The dashed line 134 indicates the centre of a dead zone at 21 mm from the mouthpiece end of the heater arrangement 23, the dead zone being a zone of the heating chamber 29 associated with gap between the sub-heating zone 226 if the first heating zone 220 and the sub-heating zone 236 of the second heating zone 230 indicated by the length T in FIG. 11.

In the example of FIG. 13, the temperature, at which the centre of the heater arrangement 23 (and the heating chamber 29) is desired to be, is 250° C. The first target temperature for zone 220 and the second target temperature for zone 230 are therefore both 250° C. The line 138a indicates the maximum acceptable temperature of 255° C., and the line 138b indicates the minimum acceptable temperature of 245° C. when the desired temperature is 250° C. Part 135 of the temperature gradient indicates the temperature decreasing towards the distal end of the heater arrangement 23, and part 137 of the length temperature gradient indicates the temperature decreasing towards the mouthpiece end of the heater arrangement 23. However, the temperature gradient, in this example, between the position 131 of the sensor 320 and the position 132 of the sensor 330 is substantially flat.

In examples of the device 1, the controller may be configured to vary the first and second target temperatures for the zones 220 and 230 respectively, independently during a session of use of the device 1. In one example, the controller is configured to control the first and second target temperatures for the zones 220 and 230 such that they are not set to the same temperature or they do not reach the same temperature at substantially any point during a session of use of the device 1. However, it should be appreciated that selecting the positions of the first and second temperature sensors 320 and 330 such that if both the first and second target temperature are the same temperature the temperature gradient between the first sensor 320 and the second sensor 330 is substantially flat, provides the benefit of optimizing the heating of the tobacco within the heating chamber 29.

More specifically, if the location of the first and second sensors 320 and 330 is selected as described above, excessive or inadequate heating of certain regions of the tobacco in the heating chamber 29 may be avoided during a session of use in which the controller does not set the first and second target temperatures to be the same temperature or they do not reach the same temperature. For example, if the first and second sensors 320 and 330 are placed too close together, irrespective of the first and second target temperatures set by the controller, when both the first and second target temperatures are non-zero, the temperature between the two sensors may become excessively high and the tobacco in the region of the heating chamber 29 between the two temperature sensors may be excessively heated. Conversely, if the first and second temperature sensors 320 and 330 are placed too far apart, the tobacco in the region of the heating chamber 29 in between the two temperature sensors may not be adequately heated and the tobacco in this region may be wasted.

Figure 14:
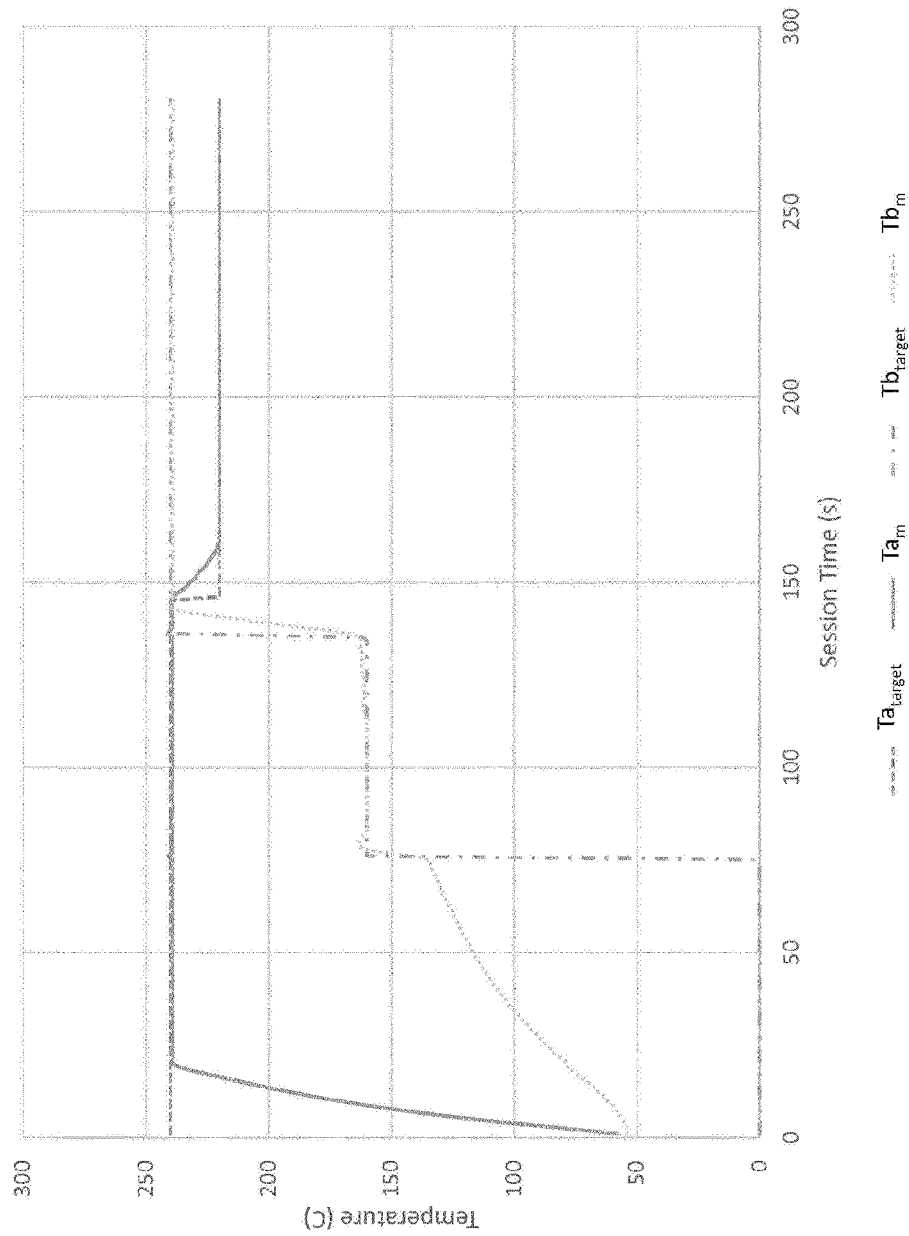
FIG. 14 shows a graph showing the time evolution of a pair of target and corresponding measured temperatures within the heating arrangement of FIG. 12.

FIG. 14 is an example of the variation of the first and second target temperatures, and the corresponding variation of the temperatures measured by the sensors 320 and 330 during some examples of a session of use of the device 1. In FIG. 14, the first target temperature (the target temperature of zone 220) is indicated by $Ta_{target}$, and the temperature measured by the sensor 320 associated with zone 220 is indicated by $Ta_m$. On the other hand, the second target temperature (the target temperature of zone 230) is indicated by $Tb_{target}$, and the temperature measured by the sensor 330 associated with zone 230 is indicated by $Tb_m$. FIG. 14 illustrates that the first control loop controls the heater arrangement 23 such that the measured temperatures $Ta_m$ of the zone 220 increases towards $Ta_{target}$, and once the first target temperature $Ta_{target}$ is reached, the measured temperature $Ta_m$ is maintained at the first target temperature $Ta_{target}$. The second control loop similarly controls the heater arrangement 23 such that the measured temperatures $Tb_m$ of the zone 230 increases towards $Tb_{target}$, and once the second target temperature $Tb_{target}$ is reached, the measured temperature $Tb_m$ is maintained at the second target temperature $Tb_{target}$.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A method of manufacturing an aerosol provision apparatus for heating smokable material to volatilize at least one component of the smokable material, the method comprising:
    providing a heater arrangement for heating smokable material contained in use within the apparatus, the heater arrangement comprising at least a first heating zone and a second heating zone for heating different portions of the smokable material;
    providing a temperature sensor for each of the first and second heating zones; and
    positioning each temperature sensor in its associated heating zone at a respective position selected so that if the heating arrangement were to heat the first and second heating zones so that the temperature sensors measure the same pre-selected target temperature, a temperature gradient across the length of the heating zones between the temperature sensors would be optimized as being substantially flat.

2. A method as claimed in claim 1, wherein each temperature sensor is for providing temperature measurements to be used as input temperature measurements for a respective temperature control loop, and each control loop is for controlling the heater arrangement to heat the associated respective heating zone to a target temperature based on the input temperature measurements acquired by the associated temperature sensor.

3. A method as claimed in claim 1, wherein the heater arrangement is arranged so that at least one of the first and second heating zones comprises at least a first sub-heating zone and a second sub-heating zone and wherein the first sub-heating zone has a higher watt heating density than does the second sub-heating zone.

4. A method as claimed in claim 3, wherein the heater arrangement is arranged so that each of the first and second heating zones comprises at least a first sub-heating zone and a second sub-heating zone and wherein for each of the first and second heating zones, the first sub-heating zone has a higher watt heating density than does the second sub-heating zone.

5. A method as claimed in claim 4, wherein the heater arrangement is arranged so that the first and second heating zones are arranged either side of a center of the heater arrangement and wherein the first sub-heating zone of the first heating zone is located closer towards a first end of the heater arrangement than is the second sub-heating zone of the first heating zone, and the first sub-heating zone of the second heating zone is located closer towards a second end of the heater arrangement than is the second sub-heating zone of the second heating zone, and the second sub-heating zone of the first heating zone and the second sub-heating zone of the second sub-heating zone are located towards the center of the heater arrangement.

6. A method as claimed in claim 5, wherein the temperature sensor for the first heating zone is positioned in the second sub-heating zone of the first heating zone and the temperature sensor for the second heating zone is positioned in the second sub-heating zone of the second heating zone.

7. A method as claimed in claim 1, further comprising providing an insulator for the heating arrangement to prevent heat escaping from the heating arrangement.

8. A method as claimed in claim 7, wherein the insulator comprises a vacuum tube.

9. An aerosol provision apparatus for heating smokable material to volatilize at least one component of the smokable material, the apparatus comprising:
    a heater arrangement for heating smokable material contained in use within the apparatus, the heater arrangement comprising at least a first heating zone and a second heating zone for heating different portions of the smokable material; and
    a temperature sensor for each of the first and second heating zones; wherein
    each temperature sensor is positioned in its associated heating zone at a selected position so that, if the heating arrangement were to heat the first and second heating zones so that the temperature sensors measure the same pre-selected target temperature, a temperature gradient across the length of the heating zones between the temperature sensors would be optimized as being substantially flat.

10. An aerosol provision apparatus as claimed in claim 9, wherein each temperature sensor is for providing temperature measurements to be used as input temperature measurements for a respective temperature control loop, and each control loop is for controlling the heater arrangement to heat the associated respective heating zone to a target temperature based on the input temperature measurements acquired by the associated temperature sensor.

11. An aerosol provision apparatus as claimed in claim 9, wherein the heater arrangement is arranged so that at least one of the first and second heating zones comprises at least a first sub-heating zone and a second sub-heating zone and wherein the first sub-heating zone has a higher watt heating density than does the second sub-heating zone.

12. An aerosol provision apparatus as claimed in claim 11, wherein the heater arrangement is arranged so that each of the first and second heating zones comprises at least a first sub-heating zone and a second sub-heating zone and wherein for each of the first and second heating zones, the first sub-heating zone has a higher watt heating density than does the second sub-heating zone.

13. An aerosol provision apparatus as claimed in claim 12, wherein the heater arrangement is arranged so that the first and second heating zones are arranged either side of a center of the heater arrangement and wherein the first sub-heating zone of the first heating zone is located closer towards a first end of the heater arrangement than is the second sub-heating zone of the first heating zone, the first sub-heating zone of the second heating zone is located closer towards a second end of the heater arrangement than is the second sub-heating zone of the second heating zone and the second sub-heating zone of the first heating zone and the second sub-heating zone of the second sub-heating zone are located towards the center of the heater arrangement.

14. An aerosol provision apparatus as claimed in claim 13, wherein the temperature sensor for the first heating zone is positioned in the second sub-heating zone of the first heating zone and the temperature sensor for the second heating zone is positioned in the second sub-heating zone of the second heating zone.

15. An aerosol provision apparatus as claimed in claim 9, further comprising an insulator for the heating arrangement to prevent heat escaping from the heating arrangement.

16. An aerosol provision apparatus as claimed in claim 15, wherein the insulator comprises a vacuum tube.

17. An aerosol provision apparatus as claimed in claim 9, further comprising a housing containing the heater arrangement and a mouthpiece through which a user can inhale volatized smokable material.

18. An aerosol provision apparatus as claimed in claim 17, wherein the apparatus is hand-holdable.

19. A method of manufacturing an aerosol provision apparatus for heating smokable material to volatilize at least one component of the smokable material, the method comprising:
   providing a heater arrangement for heating smokable material contained in use within the apparatus, the heater arrangement comprising at least a first heating zone and a second heating zone for heating different portions of the smokable material;
   providing a temperature sensor for each of the first and second heating zones; and
   positioning each temperature sensor in its associated heating zone at a respective position selected so that the temperature sensor for the first heating zone is positioned to measure the temperature at a part of the first heating zone with which that temperature sensor is associated, the part of the first heating zone being halfway between a first end of the heater arrangement and a center of the heater arrangement or is closer to the first end of the heater arrangement than it is to the center of the heating arrangement, and the temperature sensor for the second heating zone is positioned to measure the temperature at a part of the second heating zone, the part of the second heating zone being halfway between a second end of the heater arrangement and a center of the heater arrangement or is closer to the second end of the heater arrangement than it is to the center of the heating arrangement.

20. An aerosol provision apparatus for heating smokable material to volatilize at least one component of the smokable material, the apparatus comprising:
   a heater arrangement for heating smokable material contained in use within the apparatus, the heater arrangement comprising at least a first heating zone and a second heating zone for heating different portions of the smokable material; and
   a temperature sensor for each of the first and second heating zones;
   wherein each temperature sensor is positioned in its associated heating zone at a respective position selected so that the temperature sensor for the first heating zone is positioned to measure the temperature at a part of the first heating zone with which that temperature sensor is associated, the part of the first heating zone being halfway between a first end of the heater arrangement and a center of the heater arrangement or is closer to the first end of the heater arrangement than it is to the center of the heating arrangement, and the temperature sensor for the second heating zone is positioned to measure the temperature at a part of the second heating zone, the part of the second heating zone being halfway between a second end of the heater arrangement and a center of the heater arrangement or is closer to the second end of the heater arrangement than it is to the center of the heating arrangement.

* * * * *